(12) United States Patent
Clark et al.

(10) Patent No.: US 10,789,533 B2
(45) Date of Patent: Sep. 29, 2020

(54) GENERATING A CONSISTENTLY LABELED TRAINING DATASET BY AUTOMATICALLY GENERATING AND DISPLAYING A SET OF MOST SIMILAR PREVIOUSLY-LABELED TEXTS AND THEIR PREVIOUSLY ASSIGNED LABELS FOR EACH TEXT THAT IS BEING LABELED FOR THE TRAINING DATASET

(71) Applicant: GetGo, Inc., Boston, MA (US)

(72) Inventors: Whitney Lige Clark, Auburn, CA (US); Ashish V. Thapliyal, Santa Barbara, CA (US); Christfried Focke, Santa Barbara, CA (US); Alexander John Huitric, Goleta, CA (US); Yogesh Moorjani, Dublin, CA (US)

(73) Assignee: LogMeIn, Inc., Boston, MA (US)

( * ) Notice: Subject to any disclaimer, the term of this patent is extended or adjusted under 35 U.S.C. 154(b) by 695 days.

(21) Appl. No.: 15/659,888

(22) Filed: Jul. 26, 2017

(65) Prior Publication Data

US 2019/0034807 A1    Jan. 31, 2019

(51) Int. Cl.
| | |
|---|---|
| *G06N 5/02* | (2006.01) |
| *G06F 7/08* | (2006.01) |
| *G06N 20/00* | (2019.01) |
| *G06F 16/35* | (2019.01) |
| *G06F 16/683* | (2019.01) |
| *G06K 9/62* | (2006.01) |

(52) U.S. Cl.
CPC .............. *G06N 5/022* (2013.01); *G06F 7/08* (2013.01); *G06F 16/35* (2019.01); *G06F 16/358* (2019.01); *G06F 16/685* (2019.01); *G06K 9/6254* (2013.01); *G06K 9/6256* (2013.01); *G06N 20/00* (2019.01)

(58) Field of Classification Search
CPC ...... G06K 9/6217–6265; G06K 9/6253–6254; G06K 9/6256–6259; G06K 9/6254; G06F 7/08

See application file for complete search history.

(56) References Cited

U.S. PATENT DOCUMENTS

| | | |
|---|---|---|
| 6,009,199 A | 12/1999 | Ho |
| 7,272,583 B2 | 9/2007 | Bradski |
| 7,305,132 B2 | 12/2007 | Singh et al. |
| 7,792,353 B2 | 9/2010 | Forman et al. |

(Continued)

*Primary Examiner* — Stanley K. Hill
(74) *Attorney, Agent, or Firm* — BainwoodHuang

(57) ABSTRACT

Technology for generating a consistently labeled training dataset. For each one of multiple previously labeled texts, a distance between the previously labeled text and a current text to be labeled is generated by comparing a list of tokens for the previously labeled text to a list of tokens for the current text to determine an overlap value equal to a number of tokens that match between the list of tokens for the previously labeled text and the list of tokens for the current text, and using the overlap value to calculate a distance between the previously labeled text and the current text that is inversely correlated to the overlap value. Previously labeled texts that are most similar to the current text are identified as those previously labeled texts having the shortest distances to the current text, and are displayed with their previously assigned labels in a label selection user interface.

20 Claims, 5 Drawing Sheets

(56) References Cited

U.S. PATENT DOCUMENTS

| | | |
|---|---|---|
| 8,060,808 B2 | 11/2011 | Ostrovsky et al. |
| 8,117,143 B2 | 2/2012 | Bradski |
| 8,380,647 B2 | 2/2013 | Perronnin et al. |
| 8,401,282 B2 | 3/2013 | Porikli |
| 8,615,478 B2 | 12/2013 | Bradski |
| 9,070,047 B2 | 6/2015 | Nowozin et al. |
| 10,146,863 B2 * | 12/2018 | Thapliyal ................ G06F 16/38 |
| 2007/0043774 A1 * | 2/2007 | Davis ................... G06K 9/6256 |
| 2010/0128984 A1 | 5/2010 | Lempitsky et al. |

* cited by examiner

GENERATING A CONSISTENTLY LABELED TRAINING DATASET BY AUTOMATICALLY GENERATING AND DISPLAYING A SET OF MOST SIMILAR PREVIOUSLY-LABELED TEXTS AND THEIR PREVIOUSLY ASSIGNED LABELS FOR EACH TEXT THAT IS BEING LABELED FOR THE TRAINING DATASET

TECHNICAL FIELD

The present disclosure relates generally to generating training datasets for artificial intelligence and machine learning technology, and more specifically to techniques for generating a consistently labeled training dataset by automatically generating and displaying a set of most similar previously-labeled texts and their previously assigned labels for each text that is being labeled for the training dataset.

BACKGROUND

As it is generally known in the areas of artificial intelligence and/or machine learning technology, a training dataset may be made up of labeled data from which predictive relationships are learned that are used to automatically predict labels for subsequently received unlabeled data. For such a training dataset to be effective, the data in the training dataset must be consistently labeled. For example, in the context of training a label prediction system that predicts labels for unlabeled text strings ("texts") based on how texts in a training dataset are labeled, it is critical that the labeling of the texts in the training set be consistent, such that individual labels are consistently assigned to related texts. Otherwise, if the assignment of labels to texts in the training set is inconsistent, and labels are not consistently assigned to texts that are related to each other, then a label prediction system that operates based on the training set cannot consistently predict labels for the unlabeled texts that it processes.

Previous systems for generating a labeled training dataset have operated by allowing the user to manually enter one or more labels that are to be assigned to individual texts, and then storing the manually entered labels together with the texts in a file, e.g. within an electronic spreadsheet.

SUMMARY

Unfortunately, previous systems for labeling a training dataset have exhibited significant shortcomings with regard to providing consistent labeling. Specifically, labels entered for assignment to texts in the training dataset have often not been consistent across different texts. For example, the specific type of texts to which a given label is assigned by a user may change over time, causing an unintentional change in the meaning of the label. As a result, the meaning of the label when it is assigned during a first period of time may differ from the meaning of the same label when it is assigned during a second period of time. Such inconsistent labeling may be particularly apparent when labeling of the training dataset is performed over a long period of time, and/or when the size of the training dataset is very large. In another example, when labels for texts in the training dataset are assigned by multiple users, the contents of texts for which a given label is received from one user may be significantly different from the contents of texts for which the same label is received from another user. In either of these examples, inconsistent labeling of the texts in the training dataset may result in the specific meaning of one or more labels being unclear, making it difficult or impossible for a machine learning system trained using the training dataset to automatically learn useful predictive relationships from the training dataset.

To address these and other shortcomings of previous systems, new technology is disclosed herein for generating a consistently labeled training dataset. The disclosed technology extracts tokens from a current text that is to be labeled, to generate a list of tokens for the current text. The disclosed technology also generates, for each one of multiple previously labeled texts, a distance between the previously labeled text and the current text. Each distance between a previously labeled text and the current text is generated by i) extracting tokens from the previously labeled text to generate a list of tokens for the previously labeled text, ii) comparing the list of tokens for the previously labeled text to the list of tokens for the current text to determine an overlap value for the previously labeled text that is equal to a total number of tokens that match between the list of tokens for the previously labeled text and the list of tokens for the current text, and iii) using the overlap value for the previously labeled text to calculate a distance between the previously labeled text and the current text that is inversely correlated to the overlap value for the previously labeled text. A set of previously labeled texts that are most similar to the current text is then generated by selecting a predetermined number of the previously labeled texts that have the shortest distances between them and the current text. Within a label selection user interface displayed by a display device, the disclosed technology then displays the current text simultaneously with i) the set of previously labeled texts that are most similar to the current text, and ii) labels that were previously assigned to the previously labeled texts in the set of previously labeled texts that are most similar to the current text. The label selection user interface is further operable to receive user indications that cause at least one label to be assigned to the current text. In some embodiments, using the overlap value for a previously labeled text to calculate a distance between the previously labeled text and the current text that is inversely correlated to the overlap value for the previously labeled text may include calculating a normalization value for the previously labeled text by taking a square root of a product of i) a total number of tokens in the list of tokens for the current text, and ii) a total number of tokens in the list of tokens for the previously labeled text, and then setting the distance between the previously labeled text and the current text equal to one minus a result of dividing the overlap value for the previously labeled text by the normalization value for the previously labeled text. The result of dividing the overlap value for the previously labeled text by the normalization value for the previously labeled text is a cosine distance between the token list for the previously labeled text and the token list for current text, in which the lengths of the two token lists are advantageously factored out. By using such a cosine distance, embodiments of the disclosed technology can advantageously determine a distance between a previously labeled text and a current text to be labeled that is effectively independent from the lengths of the two texts.

In some embodiments, the set of previously labeled texts that are most similar to the current text may be selected from the multiple previously labeled texts at least in part by sorting the distances between the previously labeled texts and the current text in ascending order to generate an ordered list of distances, and then selecting the predetermined number of the previously labeled texts having the shortest distances between them and the current text based on the ordered list of distances.

In some embodiments, tokens may be extracted from the current text to generate the list of tokens for the current text at least in part by i) identifying words that each occur one or more times in the current text, and ii) storing a single copy of each one of the words that occur one or more times in the current text into the list of tokens for the current text. Tokens may be extracted from each previously labeled text to generate the list of tokens for the previously labeled text at least in part by i) identifying multiple words that each occur one or more times in the previously labeled text, and ii) storing a single copy of each one of the words that occur one or more times in the previously labeled text into the list of tokens for the previously labeled text.

In some embodiments, the label selection user interface may be a user interface displayed by a display device of a client computer. The set of previously labeled texts that are most similar to the current text, and the labels that were previously assigned to individual ones of the previously labeled texts in the set of previously labeled texts that are most similar to the current text may both be transmitted from a server computer to the client computer for display in the label selection user interface.

In some embodiments, the current text may be a previously labeled text to which at least one label has previously been assigned. The label selection user interface may display the label previously assigned to the current text and be further operable to receive a user indication causing the label previously assigned to the current text to be de-assigned from the current text within the training dataset.

In some embodiments, the training dataset may be passed to a label prediction system that automatically predicts labels for unlabeled texts based on how texts in the training dataset are labeled. The labels automatically predicted by the label prediction system may be automatically assigned to unlabeled texts that are then stored with all other previously labeled texts. The labeled training dataset may itself also be stored with all previously labeled texts, including labels assigned in response to user indications received by the label selection user interface.

The labels previously assigned to individual ones of the previously labeled texts in the set of previously labeled texts that are most similar to the current text may include at least one label that was predicted by the label prediction system. In addition, the labels previously assigned to individual ones of the previously labeled texts in the set of previously labeled texts that are most similar to the current text may also include at least one label that was assigned in response to a user indication received by the label selection user interface. The label selection user interface may display those previously assigned labels that were predicted by the label prediction system in a visually distinct manner from those previously assigned labels that were assigned in response to a user indication received by the label selection user interface.

In some embodiments, the multiple previously labeled texts from which the set of most similar previously labeled texts is generated may be a subset of all previously labeled texts, where the subset is generated by sampling all previously labeled texts based on the times at which labels were assigned to the previously labeled texts. For example, all previously labeled texts may be sampled to generate a subset of all the previously labeled texts, where each one of the previously labeled texts in the subset was labeled during a different one of multiple discrete preceding time periods.

While the disclosed technology is generally applicable to various specific types of texts or other data, in some embodiments the texts (e.g. the current text, previously labeled texts, etc.) may each be made up of textual user feedback that was entered through a user interface generated to obtain user feedback regarding performance of an online meeting application.

In some embodiments digital audio data may be received, and speech to text conversion processing may be performed on the received digital audio data to generate the texts on which the disclosed technology operates. For example, such received digital audio may be digital recordings of incoming voice calls to which labels are to be assigned. In such embodiments, some or all of the texts (e.g. the current text, previously labeled texts, etc.) may be made up of text that is the output of speech to text conversion processing performed on the received audio data.

The label selection user interface does not require that a label be assigned to the current text. Moreover, in some embodiments, the label selection user interface is further operable to receive an express indication from the user that the current text should not be included as part of the training dataset, and/or that the current text should not be used by an automatic labeling system that uses the training dataset to learn predictive relationships. Such an indication may be appropriate for current texts that are insignificant or that lack sufficient meaning to be accurately labeled and/or to be effectively used by an automatic labeling system to learn predictive relationships.

Embodiments of the disclosed technology may provide significant advantages over previous approaches. For example, by generating a set of previously labeled texts that are most similar to a current text, and displaying the set of previously labeled texts that are most similar to the current text along with labels that were previously assigned to individual ones of the previously labeled texts that are most similar to the current text in a label selection user interface, the disclosed technology indicates to a user of the label selection user interface how previously labeled texts that are most similar to the current text have been labeled at previous times. In this way the disclosed technology causes specific labels to be used consistently at different times, and accordingly to have a consistent meaning over time. The meaning of a label when it is assigned during a first period of time will accordingly not significantly differ from the meaning of the same label when it is assigned during a second period of time. Labeling of the training dataset may accordingly be successfully performed over long periods of time, and/or when the size of the training dataset is very large, without the meanings of specific labels changing unintentionally. In addition, ongoing assignments of specific labels will be consistent with past assignments even when the past assignments were made by a different user or users. By improving the consistency of labeling in the training dataset over that provided by previous technologies, the disclosed technology enables an automatic labeling system that uses the training dataset to learn predictive relationships from the training set to make more accurate label predictions.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments are provided by way of example to illustrate various features and principles of the disclosed technology, and that the claimed invention is broader than the specific examples of embodiments described herein.

The individual features of the particular embodiments, examples, and implementations described herein can be combined in any manner that makes technological sense. Such features are hereby combined to form all possible combinations, permutations and variants except to the extent that such combinations, permutations and/or variants have been explicitly excluded or are technically impractical. Support for all such combinations, permutations and variants is considered to exist in this document.

Figure 1:
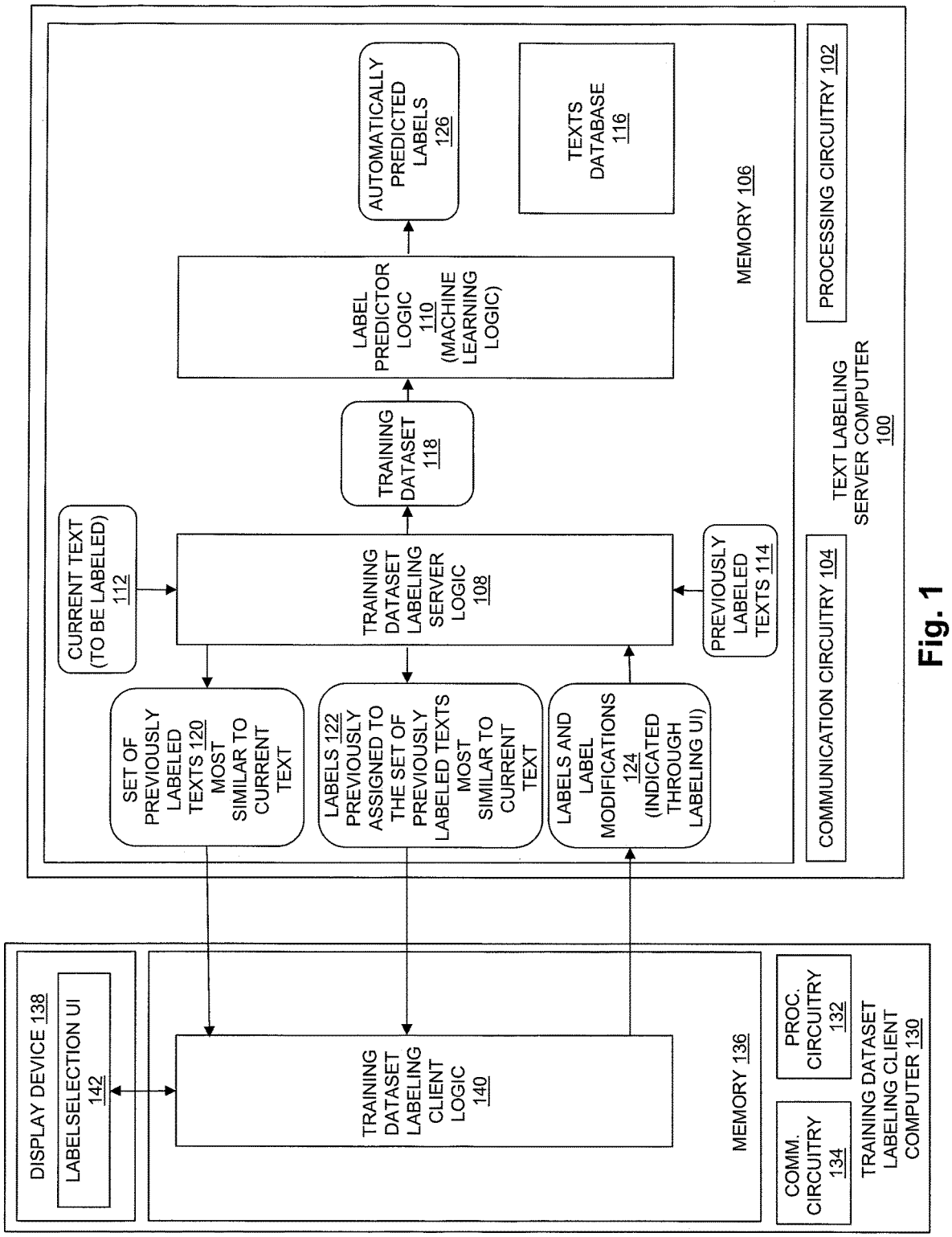
FIG. 1 is a block diagram illustrating an example of a text labeling server computer and a training dataset labeling client computer in some embodiments.

As shown in FIG. 1, in an example of components in some embodiments of the disclosed technology, a Text Labeling Server Computer 100 and a Training Dataset Labeling Client Computer 130 are communicably coupled. Text Labeling Server Computer 100 and Training Dataset Labeling Client Computer 130 may be communicably coupled through any specific type of communication network and/or computer network that allows computers to exchange data, such as one or more Local Area Networks (LANs), Wireless Local Area Networks (WLANs), Wide Area Networks (WANs), e.g. the Internet, and/or any other specific type of network.

The Text Labeling Server Computer 100 includes Processing Circuitry 102, Communication Circuitry 104, and Memory 106. Processing Circuitry 102 may, for example, consist of or include one or more microprocessors and associated circuitry. Communication Circuitry 104 may, for example, consist of or include one or more network interface controllers (NICs) or the like that connect Text Labeling Server Computer 100 to one or more computer networks, through which Text Labeling Server Computer 100 is communicably connected to Training Dataset Labeling Client Computer 130. Memory 106 may, for example, consist of or include any specific type of volatile or non-volatile semiconductor memory or the like that is operable to store programs (sequences of instructions) and/or data (e.g. program inputs, program outputs, program state information, etc.) for use in the Text Labeling Server Computer 100. Processing Circuitry 102 and Memory 106 together form control circuitry, which is constructed and arranged to carry out various methods and functions as described herein.

In the example of FIG. 1, Memory 106 stores a variety of software components that may be provided in the form of executable program code, including Training Dataset Labeling Server Logic 108, which is configured and arranged to generate a consistently labeled training dataset, shown for purposes of illustration by Training Dataset 118. Training Dataset 118 may, for example, be a database or data structure that contains one or more entries, each of which corresponds to and represents a respective text and its assigned labels. Training Dataset 118 may be used to train a machine learning component, shown for purposes of illustration by Label Predictor Logic 110. Label Predictor Logic 110 may be program code that is configured and arranged to, when executed by Processing Circuitry 102, automatically learn predictive relationships from Training Dataset 118, and also to use those learned predictive relationships to automatically predict labels (e.g. Automatically Predicted Labels 126) for unlabeled texts. Automatically Predicted Labels 126 may be automatically assigned to the unlabeled texts for which they are predicted, and then stored with those previously unlabeled texts together with all other previously labeled texts that are stored in Texts Database 116. Texts Database 116 may store some or all of the texts processed by Training Dataset Labeling Server Logic 108 and/or Label Predictor Logic 110, together with their assigned labels. Texts Database 116 may be used to store both unlabeled and previously labeled texts. When the program code stored in Memory 106 is executed by Processing Circuitry 102, Processing Circuitry 102 is caused to carry out the operations of the software components. Although certain software components are shown and described for purposes of illustration and explanation, those skilled in the art will recognize that Memory 106 may include various other components, such as an operating system, and various other applications, processes, etc.

The Training Dataset Labeling Client Computer 130 includes Processing Circuitry 132, Communication Circuitry 134, Memory 136, and Display Device 138. Processing Circuitry 132 may, for example, consist of or include one or more microprocessors and associated circuitry. Communication Circuitry 134 may, for example, consist of or include one or more NICs or the like that connect Training Dataset Labeling Client Computer 130 to one or more computer networks, through which Training Dataset Labeling Client Computer 130 is communicably connected to Text Labeling Server Computer 100. Memory 136 may, for example, consist of or include any specific type of volatile or non-volatile semiconductor memory or the like that is operable to store programs (sequences of instructions) and/or data (e.g. program inputs, program outputs, program state information, etc.) for use in the Training Dataset Labeling Client Computer 130. Processing Circuitry 132 and Memory 136 together form control circuitry, which is constructed and arranged to carry out various methods and functions as described herein. Display Device 138 may consist of or include any specific type of output device operable to present information in visual form, such as a computer monitor or other type of electronic visual display. Memory 136 stores a variety of software components that may be provided in the form of executable program code, including Training Dataset Labeling Client Logic 140, which is operable to generate Label Selection User Interface 142. Label Selection User Interface 142 is displayed by Display Device 138, and simultaneously displays at least a current text that is to be labeled, a set of previously labeled texts that are most similar to the current text, and the labels previously assigned to those similar texts. Label Selection User Interface 142 further includes user display objects that enable receipt of user indications of labels that are to be assigned to the current text. Label Selection User Interface 142 may further include display objects that enable receipt of label modifications (e.g. label de-assignments) with regard to labels that were previously assigned to the similar previously labeled texts and/or to the current text. When the program code stored in Memory 136 is executed by Processing Circuitry 132, Processing Circuitry 132 is caused to carry out the operations of the software components. Although certain software components are shown and described for purposes of illustration and explanation, those skilled in the art will recognize that Memory 136 may include various other software components, such as an operating system, and various other applications, processes, etc.

During an example of operation of the components shown in FIG. 1, the Training Dataset Labeling Server Logic 108 receives a Current Text 112 that is to be labeled, and some number of Previously Labeled Texts 114. Current Text 112 and each one of Previously Labeled Texts 114 may, for example, consist of or include a text string or the like, that may be made up of a sequence of characters that may, for example, be implemented as an array data structure of bytes or words that stores the sequence of characters using a character encoding for each character (e.g. a Unicode, ASCII, or other type of character encoding).

Current Text 112 and/or Previously Labeled Texts 114 may, for example, be retrieved from Training Dataset 118. Alternatively, Current Text 112 and/or Previously Labeled Texts 114 may be retrieved in whole or in part from Texts Database 116.

The Current Text 112 may be an unlabeled text, to which no labels have previously been assigned. Alternatively, Current Text 112 may be a previously labeled text, to which one or more labels have previously been assigned.

While the technology described herein may be embodied to operate using various specific types of texts and/or other specific types of data, in some embodiments the Current Text 112 and Previously Labeled Texts 114 may be made up of textual user feedback that was received through a user feedback user interface into which users entered textual user feedback regarding the performance of one or more applications, such as text feedback regarding the performance of an online meeting application or some other specific application. For example, a user feedback user interface may be provided for entry of such texts on one or more client computer systems (not shown) that are separate and independent from Text Labeling Server Computer 100 and/or Training Dataset Labeling Client Computer 130. Individual texts processed using the disclosed technology may consist of or include complete user feedback texts (e.g. complete sentences, paragraphs, pages, etc.) that were obtained through the user feedback user interface, and/or phrases or sentences that were automatically extracted from larger user feedback texts that were obtained through the user feedback user interface.

Training Dataset Labeling Server Logic 108 extracts tokens from Current Text 112, and generates a list of tokens for Current Text 112 using the extracted tokens. For example, in some embodiments, Training Dataset Labeling Server Logic 108 may extract tokens from Current Text 112 and generate the list of tokens for Current Text 112 using the extracted tokens by first identifying words that each occur one or more times in Current Text 112 (e.g. by segmenting Current Text 112 into single words based on the locations of blank space in Current Text 112), and then storing a single copy of each one of the identified words into the list of tokens for Current Text 112. For example, if Current Text 112 consists of the text string "restarted conference due to poor conference sound quality", Training Dataset Labeling Server Logic 108 may first identify the following words as occurring one or more times in Current Text 112: "restarted", "conference", "due", "to", "poor", "sound" and "quality". Training Dataset Labeling Server Logic 108 may then store a single copy of each of "restarted", "conference", "due", "to", "poor", "sound" and "quality" into the list of tokens for Current Text 112. In some embodiments, Training Dataset Labeling Server Logic 108 may further operate to omit from the list of tokens certain predetermined words that have relatively insignificant meanings, such as "due" and "to" in the example text, resulting in a list of tokens for Current Text 112 consisting of "restarted", "conference", "poor", "sound" and "quality". In some embodiments, Training Dataset Labeling Server Logic 108 may further operate to perform stemming on the words in Current Text 112 prior to identifying the words that occur one or more times in Current Text 112. Such stemming may include reducing each word in Current Text 112 to its stem, base or root form. In such embodiments, "restarted" in the preceding example may be reduced to "start", resulting in a list of tokens for Current Text 112 consisting of "start", "conference", "poor", "sound" and "quality". Other specific types of preprocessing may be performed on the Current Text 112 in addition to or in the alternative to those described above while generating the list of tokens for Current Text 112. While in the preceding example the tokens are described as consisting of individual words, the disclosed technology may also be embodied such that some or all of the tokens are made up of multiple words.

Training Dataset Labeling Server Logic 108 generates, for each one of the previously labeled texts in Previously Labeled Texts 114, a distance between the previously labeled text and the Current Text 112. Training Dataset Labeling Server Logic 108 may generate the distance between each one of the previously labeled texts in Previously Labeled Texts 114 and Current Text 112 by i) extracting tokens from the previously labeled text to generate a list of tokens for the previously labeled text, for example using techniques such as those described above with regard to extracting tokens from Current Text 112 to generate the list of tokens for Current Text 112, ii) comparing the list of tokens for the previously labeled text to the list of tokens for Current Text 112 to determine an overlap value for the previously labeled text that is equal to a total number of tokens that match between the list of tokens for the previously labeled text and the list of tokens for Current Text 112, and iii) using the overlap value for the previously labeled text to calculate a distance between the previously labeled text and Current Text 112 that is inversely correlated to the overlap value for the previously labeled text. In other words, Training Dataset Labeling Server Logic 118 generates a distance for each one of the Previously Labeled Texts 114 that is inversely correlated to the number of tokens that match between the list of tokens for the previously labeled text and the list of tokens for Current Text 112, such that smaller distances are generated for larger numbers of matching tokens.

Training Dataset Labeling Server Logic 108 then generates a Set of Previously Labeled Texts 120 containing previously labeled texts that are most similar to Current Text 112, by selecting a predetermined number of the Previously Labeled Texts 114 that have the shortest distances between them and Current Text 112. Training Dataset Labeling Server Logic 108 transmits the Set of Previously Labeled Texts 120 to Training Dataset Labeling Client Logic 140 in Training Dataset Labeling Client Computer 130. Training Dataset Labeling Server Logic 108 also transmits Labels 122 that were previously assigned to the previously labeled texts in the Set of Previously Labeled Texts 120 to Training Dataset Labeling Client Logic 140. The Current Text 112 is also transmitted from Training Dataset Labeling Server Logic 108 to Training Dataset Labeling Client Logic 140. In the case where Current Text 112 is a previously labeled text, one or more labels previously assigned to Current Text 112 may also be transmitted from Training Dataset Labeling Server Logic 108 to Training Dataset Labeling Client Logic 140.

Training Dataset Labeling Client Logic 140 simultaneously displays, within the Label Selection User Interface 142, i) the Current Text 112, i) the Set of Previously Labeled Texts 120, and iii) the Labels 122. Training Dataset Labeling Client Logic 140 also displays within Label Selection User Interface 142 one or more user interface objects that enable a user of Training Dataset Labeling Client Computer 130 to enter or otherwise indicate one or more labels that are to be assigned to Current Text 112. The labels that may be entered or otherwise indicated through Label Selection User Interface 142 for assignment to Current Text 112 may include or consist of one or more text labels (e.g. text strings) that the user may select from a predetermined set of labels. User interface objects for indicating one or more of the predetermined set of labels that are to be assigned to Current Text 112 in Training Dataset 118 may, for example, include a text entry box or the like into which a user of Training Dataset Labeling Client Computer 130 can type or otherwise enter one or more labels that are to be assigned to Current Text 112.

In some embodiments, one or more labels from a set of previously created labels (e.g. one or more of the predetermined set of labels) may be displayed in the Label Selection User Interface 142 as suggestions for the Current Text 112. For example, one or more labels from a set of previously created labels from which labels may be selected for assignment to the Current Text 112 may be displayed as suggestions in response to the user partly or completely entering a similar label, e.g. "Audio issues" may be displayed as a suggested label in response to the user entering all or part of the similar "audio issues" label. Such displayed suggestions may advantageously improve consistency and/or make label spelling differences less likely. In some cases an entire set of permitted previously created labels from which the user is permitted to select from to assign labels to the Current Text 112 may be displayed, and the user may be required to select only from the labels in that permitted set of labels.

Training Dataset Labeling Client Logic 140 may also display within Label Selection User Interface 142 one or more user interface objects that enable the user of Training Dataset Labeling Client Computer 130 to indicate one or more modifications to be made to one or more labels that were previously assigned to either the Current Text 112, and/or one or more modifications to be made to one or more of the Labels 122. For example a separate "Delete" checkbox or the like may be displayed in visual proximity to (e.g. adjacent to) each label previously assigned to Current Text 112. Similarly, a separate "Delete" checkbox or the like maybe displayed in visual proximity to (e.g. adjacent to) each one of Labels 122. Training Dataset Labeling Client Logic 140 may detect that the user of Training Dataset Labeling Client Computer 130 has clicked on the "Delete" checkbox adjacent to a label previously assigned to Current Text 112, indicating that the label is to be de-assigned from Current Text 112. Similarly, Training Dataset Labeling Client Logic 140 may detect that the user of Training Dataset Labeling Client Computer 130 has clicked on the "Delete" checkbox adjacent to one of the Labels 122, indicating that the label is to be de-assigned from the one of the Set of Previously Labeled Texts 120 that the label was previously assigned to.

Training Dataset Labeling Client Logic 140 transmits Labels and Label Modifications 124 indicated through Label Selection User Interface 142 to Training Dataset Labeling Server Logic 108. Labels and Label Modifications 124 includes or otherwise indicates any label or labels received through Label Selection User Interface 141 that are to be assigned to Current Text 112. Labels and Label Modifications 124 may further include or otherwise indicate any label or labels that are to be de-assigned from Current Text 112, and/or any label or labels that are to be de-assigned from one or more of the previously labeled texts in the Set of Previously Labeled Texts 120.

Training Dataset Labeling Server Logic 108 receives Labels and Label Modifications 124, and assigns the label or labels entered or otherwise indicated through Label Selection User Interface 141 to Current Text 112, e.g. within Training Dataset 118. For example, Training Dataset Labeling Server Logic 108 may assign a label or labels entered or otherwise indicated through Label Selection User Interface 141 by modifying an entry or the like for Current Text 112 within Training Dataset 118 to include or otherwise indicate the label or labels. Training Dataset Labeling Server Logic 108 also performs label modifications indicated through Label Selection User Interface 138. For example, Training Dataset Labeling Server Logic 108 may de-assign one or more labels from Current Text 112 by removing the label or labels from an entry for Current Text 112, e.g. within Training Dataset 118. Training Dataset Labeling Server Logic 108 may also de-assign one or more labels from one or more of the Set of Previously Labeled Texts 120 by removing the label or labels from an entry for that previously labeled text within Training Dataset 118, or by removing the label or labels from an entry for that previously labeled text within Texts Database 116.

When all texts in Training Dataset 118 have been written by Training Dataset Labeling Server Logic 108, the Training Dataset 118 may be considered complete, and may then be passed to Label Predictor Logic 110. Label Predictor Logic 110 then automatically learns predictive relationships from Training Dataset 118. In some embodiments, Training Dataset 118 may provide labeled training data for machine learning program logic within Label Predictor Logic 110 in a supervised learning approach to machine learning. Initially, Training Dataset 118 may be generated by Training Dataset Labeling Server Logic 108 using current texts to be labeled that are unlabeled texts. Subsequently, after Label Predictor Logic 110 has begun generating Automatically Predicted Labels 126 for unlabeled texts that are then assigned to those unlabeled texts, Training Dataset 118 may be generated by Training Dataset Labeling Server Logic 108 in whole or in part using current texts to be labeled that are previously labeled texts.

In some embodiments, Label Predictor Logic 110 may automatically adjust its internal label prediction parameters based on patterns it detects with regard to the presence or absence of specific words or groups of words within the texts contained in Training Dataset 118. Specifically, Label Predictor Logic 110 may adjust its internal parameters based on detecting the presence or absence of specific words or groups of words in texts that are assigned specific labels. For example, Label Predictor Logic 110 may detect the presence of one or more specific words or groups of words in all or a significant number of texts that are assigned a specific label in Training Dataset 118. Label Predictor Logic 110 may then automatically adjust its internal parameters such that it automatically predicts or is more likely to predict the same label for subsequently received unlabeled texts that include the same words or groups of words. Alternatively, or in addition, Label Predictor Logic 110 may detect the absence of one or more words or groups of words in all or a significant number of texts that are assigned a specific label in Training Dataset 118. Label Predictor Logic 110 may then automatically adjust its internal parameters such that it automatically predicts or is more likely to predict the same label for subsequently received unlabeled texts that do not include the same words or groups of words. In another example, the presence of one or more words or groups of words in all or a significant number of texts in Training Dataset 118 that are not assigned a specific label may cause Label Predictor Logic 110 to automatically adjust its internal parameters such that it automatically predicts or is more likely to predict the absence of that label for subsequently received unlabeled texts that include the same words or groups of words. Other specific types of patterns may be detected in the contents of the texts in Training Set 118 and may be used alternatively or in addition in order to automatically predict labels for subsequently received unlabeled texts.

Texts Database 116 may store all previously labeled texts, including texts to which labels entered through Label Selection User Interface 142 were previously assigned, and texts to which labels from Automatically Predicted Labels 126 were previously assigned. For example, labels in Automatically Predicted Labels 126 may be assigned to the texts for which they are predicted in Texts Database 116. In addition, when texts in Training Dataset 118 have been processed they may also be stored into Texts Database 116, together with the labels assigned to them, including labels received through Label Selection User Interface 142. Accordingly, the labels assigned to texts stored in Texts Database 116 may include both i) automatically predicted labels, e.g. labels assigned from Automatically Predicted Labels 126, and/or ii) labels received through the label selection user interface, e.g. labels assigned in response to user indications received through Label Selection User Interface 142.

In the case where Previously Labeled Texts 114 are extracted from Texts Database 116, the Labels 122 previously assigned to individual ones of the previously labeled texts in the Set of Previously Labeled Texts 120 may include i) one or more automatically predicted labels assigned from Automatically Predicted Labels 126, and/or ii) one or more labels received by the Label Selection User Interface 142. Label Selection User Interface 142 may display those labels in Labels 122 that were assigned from Automatically Predicted Labels 126 in a visually distinct manner from those labels in Labels 122 that were received by the Label Selection User Interface 142, e.g. using different fonts, colors, etc.

In some embodiments, Previously Labeled Texts 114 may consist of all previously labeled texts stored in Texts Database 116. Alternatively, in order to improve performance by reducing the total number of previously labeled texts for which a distance must be generated by Training Dataset Labeling Server Logic 108 when processing Current Text 112, Previously Labeled Texts 114 may be automatically generated (e.g. by Training Dataset Labeling Server Logic 108) as only a subset of all previously labeled texts stored in Texts Database 116. For example, Texts Database 116 may store label assignment time information for each previously labeled text indicating the time at which the label or labels previously assigned to the text were assigned to the text. Such assignment time information may be used to generate a subset of all previously labeled texts, where each one of the previously labeled texts in the subset was labeled during a different preceding time period. Any specific set of discrete preceding time periods may be used, e.g. minutes, hours, days, weeks, etc. For example, the preceding time periods may be days, and the generated subset of all previously labeled texts may consist of one previously labeled text that was labeled in each one the preceding days since the system was started or initialized. By using a subset of previously labeled texts that is sampled across the total time since the system was started or initialized, the disclosed technology may still ensures that labels are assigned consistently across that total time period, and avoids unintentional changes to how labels are assigned over time, even when operating using less than the total number of previously labeled texts.

In some embodiments digital audio data may be received, e.g. by the Text Labeling Server Computer 100, and then speech to text conversion processing may be performed (e.g. by Training Dataset Labeling Server Logic 108) on the received digital audio data to generate the Current Text 112 and/or Previously Labeled Texts 114. For example, such received digital audio may be digital recordings of voice calls to which labels are to be assigned. In such embodiments, some or all of the texts (e.g. the Current Text 112, Previously Labeled Texts 114, etc.) may be made up of text that is the output of speech to text conversion processing performed on the received audio data. Further in such embodiments, a label from Automatically Predicted Labels 126 that is assigned to a text may be used to automatically determine how a voice call from which the text was generated is to be automatically routed, e.g. each label may indicate a different destination extension or phone number to which received voice calls may be automatically transferred in response to that label.

Figure 2:
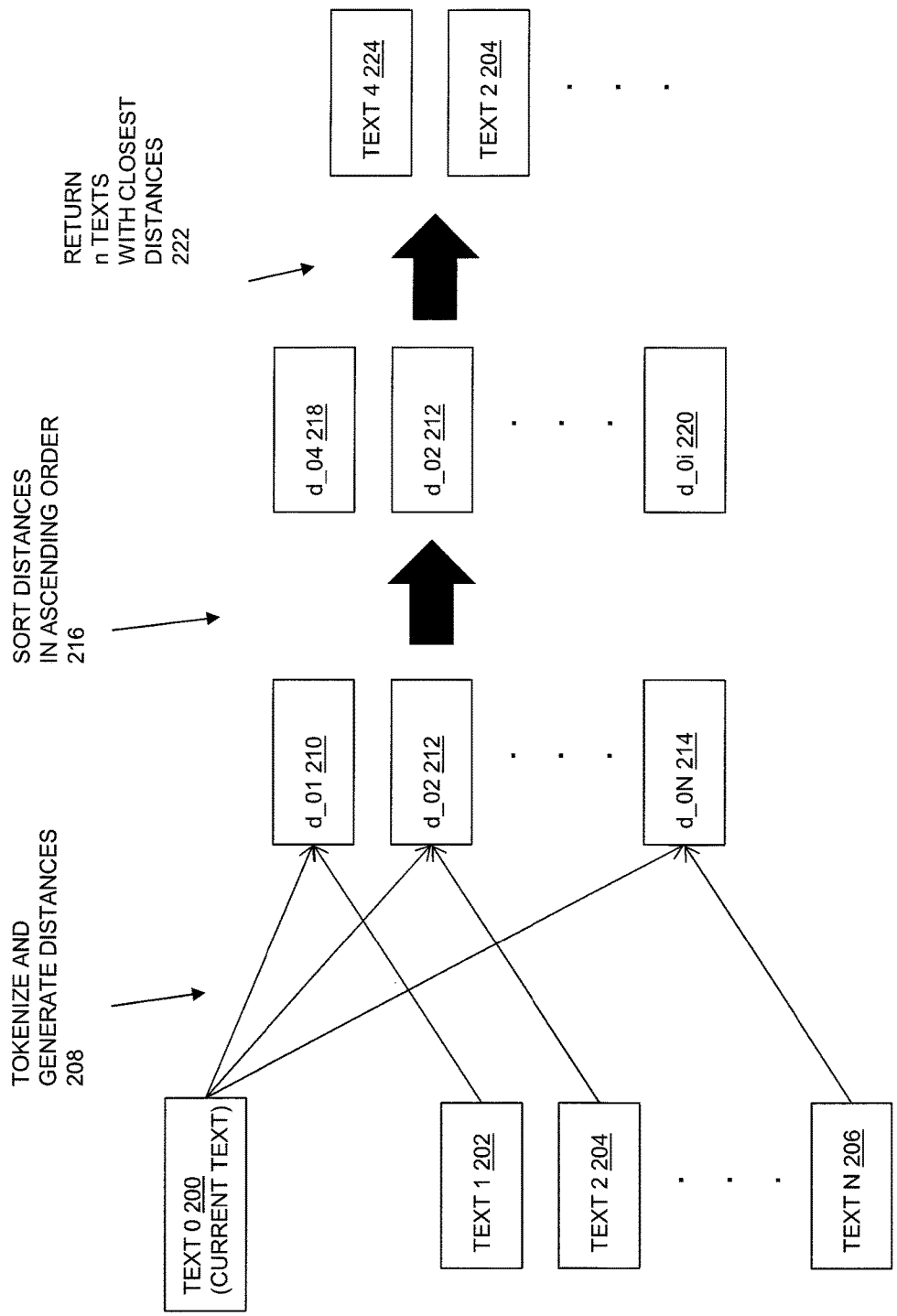
FIG. 2 is a block diagram illustrating an example of a process performed in some embodiments to generate a distance between each one of multiple previously labeled texts and a current text, and for generating a set of previously labeled texts that are most similar to the current text.

FIG. 2 is a block diagram illustrating an example of a process performed in some embodiments to generate a distance between a current text and each one of multiple previously labeled texts, and for generating a set of previously labeled texts that are most similar to the current text. In FIG. 2, an example of a current text is shown by Text 0 200, and an example of "N" previously labeled texts is shown by Text 1 202, Text 2 204, through Text N 206. At 208, the current Text 0 200 and each one of the previously labeled texts Text 1 202, Text 2 204, through Text N 206 are tokenized. The tokenization performed at 208 includes generating a list of tokens from tokens extracted from Text 0 200, and generating a list of tokens for each one of the previously labeled texts Text 1 202, Text 2 204, through Text N 206. Further at 208, for each one of the previously labeled texts Text 1 202, Text 2 204, through Text N 206, a distance is generated between the previously labeled text and Text 0 200. The distance between a given one of the previously labeled texts Text 1 202, Text 2 204, through Text N 206 and Text 0 200 is generated by comparing the list of tokens for the previously labeled text to the list of tokens for Text 0 200 to determine an overlap value for the previously labeled text that is equal to a total number of tokens that match between the list of tokens for the previously labeled text and the list of tokens for Text 0 200, and using the overlap value for the previously labeled text to calculate a distance between the previously labeled text and Text 0 200 that is inversely correlated to the overlap value for the previously labeled text. The distances generated at 208 for the previously labeled texts Text 1 202, Text 2 204, through Text N 206, are shown by the distances d_01 210, d_02 212, through d_0N 214, in which d_01 210 is the distance generated for Text 1 202, d_02 212 is the distance generated for Text 2 204, and so on through d_0N 214 which is the distance generated for Text N 206.

A set of previously labeled texts that are most similar to Text 0 200 is then generated based on the generated distances d_01 210, d_02 212 through d_0N 214. At 216 the distances d_01 210, d_02 212 through d_0N 214 are sorted in ascending order. The result of the sorting is a sorted list of the generated distances, with d_04 218 being the shortest distance, d_02 212 being the second shortest distance, and so on through d_0$i$ 220 which is the longest distance. At 222, the sorted list of distances is used to identify and return "n" of the previously labeled texts that have the shortest distances to Text 0 200, e.g. by selecting "n" previously labeled texts corresponding to the first "n" distances at the top of the sorted list of distances, as shown by Text 4 224, which corresponds to the shortest distance to Text 0 200 (i.e. d_04 218), followed by Text 2 204, which corresponds to the second shortest distance to Text 0 200 (i.e. d_02 212), and so on.

Figure 3:
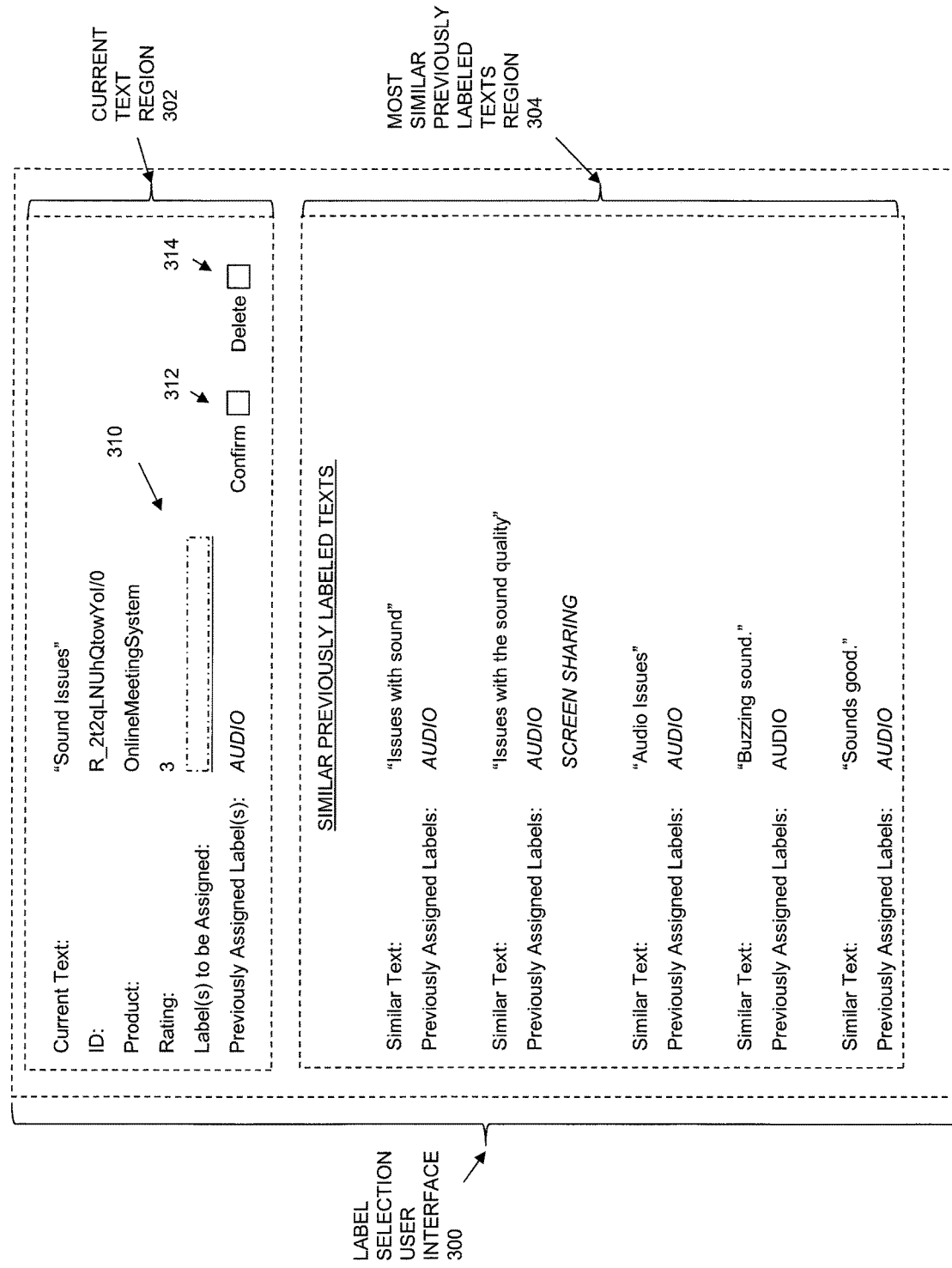
FIG. 3 is an example showing a simplified portion of a label selection user interface that may be provided in a display device of a client computer in some embodiments.

FIG. 3 shows an example of a simplified portion of a label selection user interface that may be provided in a display device of a client computer in some embodiments. The Label Selection User Interface 300 shows examples of display objects that may be included in embodiments of the Label Selection User Interface 141 (FIG. 1). A Current Text Region 302 displays a current text "Sound Issues" that was entered by a product user, an identifier "R_2t2qLNUhQtowYoI/0" for the current text, a product name "OnlineMeetingSystem" identifying the specific product for which the current text was provided by the product user, a numeric rating of "3" (e.g. Net Promoter Score) given by the product user rating their experience with the product, and a label entry field 310 that is operable to receive one or more labels typed or otherwise entered by the user that are to be assigned to the current text "Sound Issues". Current Text Region 302 also displays a previously assigned label of "AUDIO" for the current text "Sound Issues". In the example of FIG. 3, previously assigned labels that were assigned from Automatically Predicted Labels 126 (FIG. 1) are italicized, while previously assigned labels that were entered by a user through the label selection user interface are not italicized. Accordingly, because it is italicized in Current Text Region 302, the label "AUDIO" was assigned to "Sound Issues" from Automatically Predicted Labels 126. By showing visually contrasting representations of previously assigned labels that were assigned from Automatically Predicted Labels 126 and previously assigned labels that were entered by a user through the label selection user interface, the disclosed technology advantageously enables the user to perform selection of the labels to be assigned to the current text (e.g. "Sound Issues") not only with knowledge of which labels were previously assigned to similar previously labeled texts, but also with knowledge of which of those previously assigned labels were automatically assigned, and which of those previously assigned labels were assigned by a user through the label selection user interface.

Adjacent to the previously assigned label "AUDIO" are displayed a "Confirm" check box 312, and a "Delete" check box 314. The "Confirm" check box 312 enables the user to confirm the previously assigned label "AUDIO" by clicking on check box 312. In response to detecting that the user has clicked on check box 312, the disclosed technology will subsequently display the "AUDIO" as if it were assigned to the text "Sound Issues" as a result of it being entered by the user through the label selection user interface (e.g. non-italicized). The "Delete" check box 314 enables the user to indicate that the previously assigned label "AUDIO" is to be de-assigned from the current text "Sound Issues", by clicking on check box 314. In response to detecting that the user has clicked on the check box 314, the disclosed technology will de-assign the label "AUDIO" from the text "Sound Issues".

The Label Selection User Interface 300 does not require that a label be assigned to the current text. Moreover, in some embodiments, the Label Selection User Interface 300 is further operable to receive an express indication from the user that the current text should not be included as part of the training dataset, and/or that the current text should not be used by an automatic labeling system that uses the training dataset to learn predictive relationships. For example, the label entry field 310 may be operable to receive a special, predetermined text label that indicates that the current text should not be included as part of the Training Dataset 118, and/or that the current text should not be used by an automatic labeling system that uses Training Dataset 118 to learn predictive relationships, such as Label Predictor Logic 110. One example of such a predetermined text label consists of an "IGNORE" label that may be entered into the label entry field 310, or that may otherwise be indicated by the user through Label Selection User Interface 300. Such an "IGNORE" label or the like may be appropriate for current texts that are insignificant, or that lack sufficient meaning to be accurately labeled and/or to be effectively used by an automatic labeling system to learn predictive relationships.

Label Selection User Interface 300 further includes a Most Similar Previously Labeled Texts Region 304, in which is displayed each previously labeled text in a set of previously labeled texts that that the disclosed technology has determined to be most similar to the current text, together with the labels previously assigned to the previously labeled texts in the set. In the example of FIG. 3, the previously labeled texts that the disclosed technology has determined to be most similar to the current text "Sound Issues" includes i) "Issues with sound", to which the label "AUDIO" has previously been assigned, ii) "Issues with the sound quality", to which the labels "AUDIO" and "SCREEN SHARING" have previously been assigned, iii) "Audio Issues", to which the label "AUDIO" has previously been assigned, iv) "Buzzing sound", to which the label "AUDIO" has previously been assigned, and v) "Sounds good", to which the label "AUDIO" has previously been assigned. Since previously assigned labels that were automatically assigned from Automatically Predicted Labels 126 are italicized, the "AUDIO" label was previously assigned to the texts "Issues with sound", "Issues with the sound quality", "Audio Issues", and "Sounds good" from Automatically Predicted Labels 126. Similarly, since the "SCREEN SHARING" label is displayed in italics, it accordingly was also assigned to "Issues with the sound quality" from Automatically Predicted Labels 126. In contrast, for the previously labeled text "Buzzing Sound", the "AUDIO" label is not italicized, and accordingly the "AUDIO" label was previously assigned to "Buzzing Sound" in response to a user entering the label "AUDIO" through the label selection user interface.

While in the example of FIG. 3, previously assigned labels that were automatically assigned from Automatically Predicted Labels 126 are italicized, and previously assigned labels that were entered by a user through the label selection user interface are not italicized, the disclosed technology is not limited to such an approach. Alternatively, various other specific techniques may be used to display previously assigned labels that were assigned from Automatically Predicted Labels 126 in a visually distinct manner from previously assigned labels that were entered by a user through the label selection user interface. For example, previously assigned labels that were assigned from Automatically Predicted Labels 216 may be displayed in a first color, while previously assigned labels that were entered by a user through the label selection user interface may be displayed in a second color.

In addition, while in the example of FIG. 3, a "Confirm" check box and a "Delete" check box are displayed adjacent to a label that was previously assigned to the current text "Sound Issues", a "Confirm" check box and a "Delete" check box may also be displayed adjacent to each of the labels displayed in the Most Similar Previously Labeled Texts Region 304, to enable the user to confirm a previously assigned label that was assigned from Automatically Predicted Labels 216 (in the case of clicking on a "Confirm" check box), or to enable the user to indicate that a label is to be de-assigned (in the case of clicking on a "Delete" check box). Moreover, various other specific types of clickable user interface display objects may alternatively be used to receive a user indication that a label is to be confirmed, and/or to receive a user indication that label is to be de-assigned. For example, in some embodiments, instead of a "Confirm" check box, each previously assigned label may be displayed together with a clickable character (e.g. a check mark) that enables the user to confirm the previously assigned label by clicking on the character. In another example, instead of a "Delete" check box, each previously assigned label may be displayed together with another clickable character (e.g. an "x"), that enables the user to indicate that the previously assigned label is to be de-assigned by clicking on the character.

While some embodiments may provide a Label Selection User Interface 300 that displays both previously assigned labels that were assigned from Automatically Predicted Labels 216 and previously assigned labels that were entered by a user through the Label Selection User Interface 300, other embodiments may provide a Label Selection User Interface 300 that only displays previously assigned labels that were entered by a user through the Label Selection User Interface 300. In such embodiments, a "Delete" check box or the like may be displayed adjacent to each previously assigned label that is displayed, but a "Confirm" check box or the like need not be displayed adjacent to any of the previously assigned labels that are displayed. Moreover, those skilled in the art will also recognize that that even in embodiments that provide a Label Selection User Interface 300 that displays both previously assigned labels that were assigned from Automatically Predicted Labels 216 and previously assigned labels that were entered by a user through the Label Selection User Interface 300, a "Confirm" check box or the like need not be displayed adjacent to those previously assigned labels displayed in the Label Selection User Interface 300 that were entered by a user through the Label Selection User Interface 300.

Figure 4:
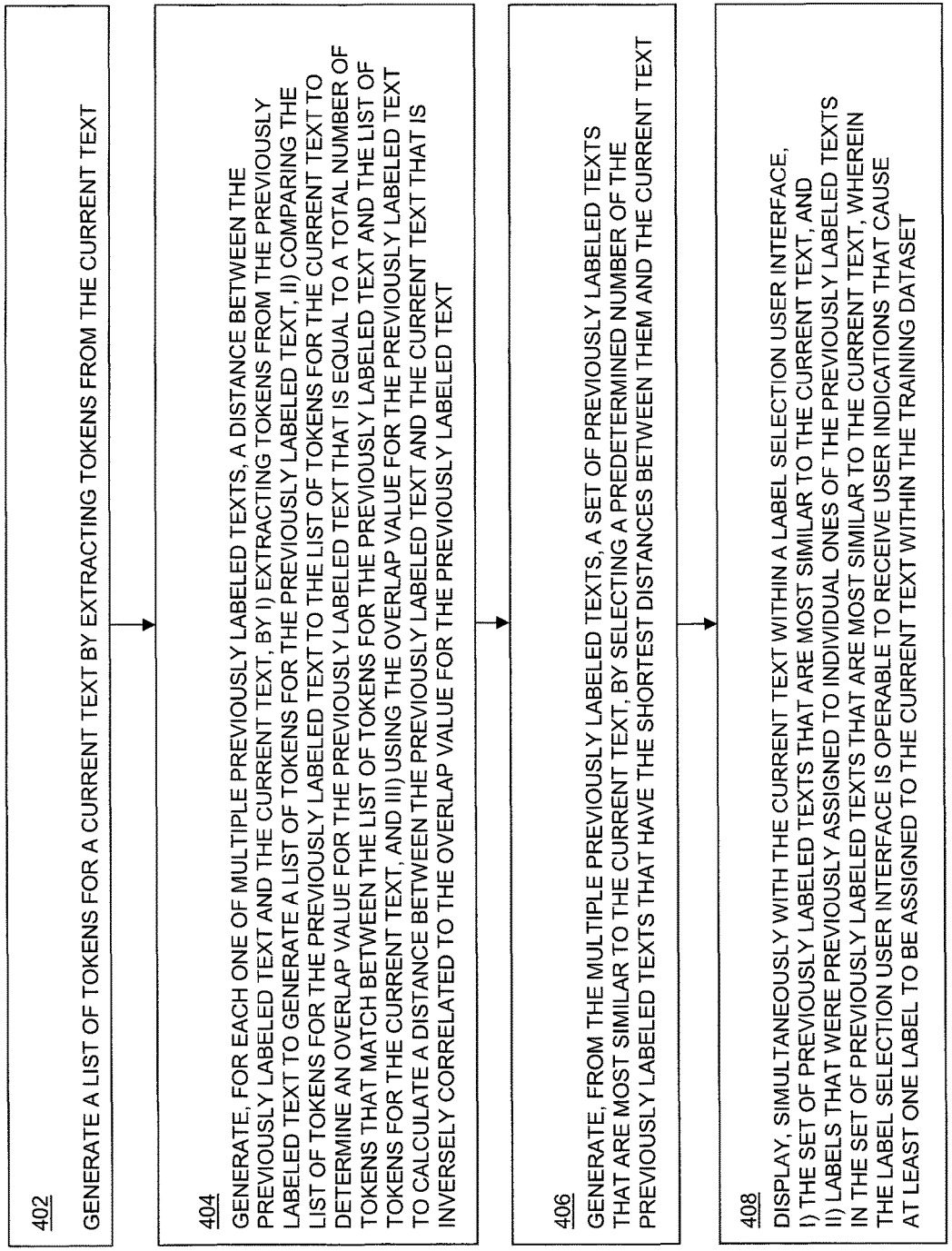
FIG. 4 is a flow chart illustrating an example of steps that may be performed in some embodiments to generate a consistently labeled training dataset.

FIG. 4 is a flow chart illustrating an example of steps that may be performed in some embodiments to generate a training dataset.

As shown in FIG. 4, at step 402 a list of tokens is generated for a current text by extracting tokens from the current text.

At step 404, for each one of multiple previously labeled texts, a distance is generated between the previously labeled text and the current text. The distance is calculated for each of the previously labeled texts by i) extracting tokens from the previously labeled text to generate a list of tokens for the previously labeled text, ii) comparing the list of tokens for the previously labeled text to the list of tokens for the current text to determine an overlap value for the previously labeled text that is equal to a total number of tokens that match between the list of tokens for the previously labeled text and the list of tokens for the current text, and iii) using the overlap value for the previously labeled text to calculate a distance between the previously labeled text and the current text that is inversely correlated to the overlap value for the previously labeled text.

At step 406, a set of previously labeled texts that are most similar to the current text are generated from the multiple previously labeled texts, by selecting a predetermined number of the previously labeled texts that have the shortest distances between them and the current text.

At step 408, the disclosed technology displays, simultaneously with the current text within a label selection user interface, i) the set of previously labeled texts that are most similar to the current text, and ii) labels that were previously assigned to individual ones of the previously labeled texts in the set of previously labeled texts that are most similar to the current text. The label selection user interface is operable to receive user indications that cause at least one label to be assigned to the current text within the training dataset.

Figure 5:
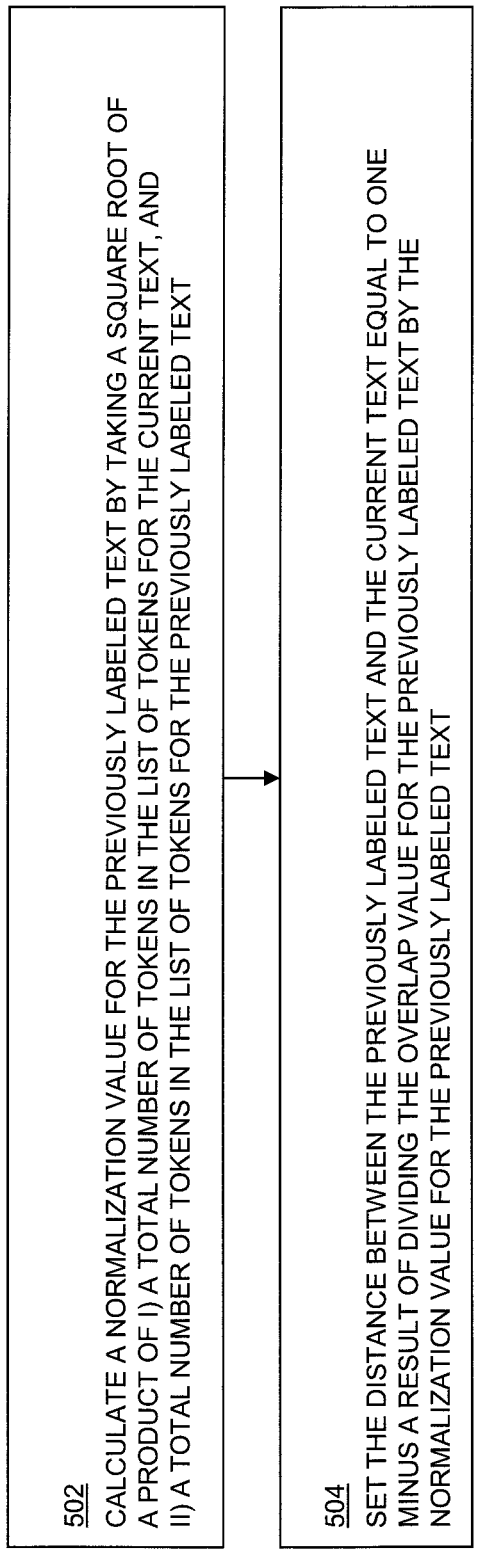
FIG. 5 is a flow chart illustrating an example of steps that may be performed in some embodiments to generate a distance between a current text to be labeled and a previously labeled text.

FIG. 5 is a flow chart illustrating an example of steps that may be performed in some embodiments to generate a distance between a previously labeled text and a current text that is to be labeled. As described above, an overlap value for the previously labeled text may be determined by comparing a list of tokens for the previously labeled text to a list of tokens for the current text and setting the overlap value for the previously labeled text to a total number of tokens that match between the list of tokens for the previously labeled text and the list of tokens for the current text. The steps of FIG. 5 illustrate how some embodiments of the disclosed technology may use the overlap value for the previously labeled text to calculate a distance between the previously labeled text and the current text that is inversely correlated to the overlap value for the previously labeled text. Specifically, at step 502, a normalization value is calculated for the previously labeled text by taking a square root of a product of i) a total number of tokens in the list of tokens for the current text, and ii) a total number of tokens in the list of tokens for the previously labeled text. At step 504, the distance between the previously labeled text and the current text is set to one minus a result of dividing the overlap value for the previously labeled text by the normalization value for the previously labeled text.

For purposes of further explanation, an example of program code is provided below that defines a function "distance" that returns a value that is equal to the distance between two texts, "text1" and "text2", where "text1" may, for example, be a previously labeled text, and "text2" may be a current text to be labeled:

```
def distance(text1, text2):                                    (1)
    if not text1.tokens or not text2.tokens: return float("inf")   (2)
```

```
overlap = len(text1.tokens.intersection(text2.tokens))      (3)
norm = math.sqrt(len(text1.tokens)*len(text2.tokens))       (4)
return 1. - overlap/norm if norm != 0. else float("inf")    (5)
```

In the above pseudo-code example, line (1) indicates that the function takes as inputs the two texts "text1" and "text2". Line (2) checks whether the token list for "text1" ("text1.tokens") or the token list for "text2" (e.g. "text2.tokens") is present. If either token list is not present, the function returns a value of "inf", indicating that a valid distance could not be calculated. Line (3) sets an overlap value of "overlap" to the length of the intersection between the tokens in the token list for "text1" and the tokens in the token list for "text2", such that "overlap" is equal to the number of tokens that match between the token list for "text1" and the token list for "text2". Line (4) sets a normalization value "norm" to the square root of the product of the number of tokens in the token list for "text1" (e.g. "len(text1.tokens)") and the number of tokens in the token list for "text2" (e.g. "len(text2.tokens)"). The result of dividing "overlap" by "norm" is a cosine distance between the token list for "text1" and the token list for "text2", in which the lengths of the two token lists are advantageously factored out. By using such a cosine distance in this way, embodiments of the disclosed technology can advantageously determine a distance between "text1" and "text2" that is effectively independent from the lengths of the two texts. Line (5) returns a distance that is equal to one minus the result of dividing "overlap" by "norm". If the value of "norm" is zero ("0"), then at least one of the token strings has a length of zero, and the value of "inf" is returned, indicating that a valid distance could not be calculated.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of generating a training dataset, comprising:
extracting tokens from a current text to generate a list of tokens for the current text;
generating, by processing circuitry, for each one of a plurality of previously labeled texts, a distance between the previously labeled text and the current text, by i) extracting tokens from the previously labeled text to generate a list of tokens for the previously labeled text, ii) comparing the list of tokens for the previously labeled text to the list of tokens for the current text to determine an overlap value for the previously labeled text that is equal to a total number of tokens that match between the list of tokens for the previously labeled text and the list of tokens for the current text, and iii) using the overlap value for the previously labeled text to calculate a distance between the previously labeled text and the current text that is inversely correlated to the overlap value for the previously labeled text;
generating, by the processing circuitry from the plurality of previously labeled texts, a set of previously labeled texts that are most similar to the current text, by selecting a predetermined number of the previously labeled texts that have the shortest distances between them and the current text; and
displaying, simultaneously with the current text within a label selection user interface displayed by a display device, i) the set of previously labeled texts that are most similar to the current text, and ii) a plurality of labels that were previously assigned to individual ones of the previously labeled texts in the set of previously labeled texts that are most similar to the current text, wherein the label selection user interface is operable to receive user indications that cause at least one label to be assigned to the current text within the training dataset.

2. The method of claim 1, wherein using the overlap value for the previously labeled text to calculate a distance between the previously labeled text and the current text that is inversely correlated to the overlap value for the previously labeled text includes:
   calculating a normalization value for the previously labeled text by taking a square root of a product of i) a total number of tokens in the list of tokens for the current text, and ii) a total number of tokens in the list of tokens for the previously labeled text; and
   setting the distance between the previously labeled text and the current text equal to one minus a result of dividing the overlap value for the previously labeled text by the normalization value for the previously labeled text.

3. The method of claim 2, wherein generating, by the processing circuitry from the plurality of previously labeled texts, the set of previously labeled texts that are most similar to the current text, includes:
   sorting the distances between the previously labeled texts and the current text in ascending order to generate an ordered list of distances; and
   selecting the predetermined number of the previously labeled texts having the shortest distances between them and the current text in response to the ordered list of distances.

4. The method of claim 3, wherein extracting tokens from the current text to generate the list of tokens for the current text includes i) identifying a plurality of words that each occur one or more times in the current text, and ii) storing a single copy of each one of the words that occur one or more times in the current text into the list of tokens for the current text; and
   wherein extracting tokens from the previously labeled text to generate the list of tokens for the previously labeled text includes i) identifying a plurality of words that each occur one or more times in the previously labeled text, and ii) storing a single copy of each one of the words that occur one or more times in the previously labeled text into the list of tokens for the previously labeled text.

5. The method of claim 4, wherein the label selection user interface displayed by a display device comprises a user interface displayed by a display device of a client computer, and further comprising:
   transmitting, by communications circuitry to the client computer, i) the set of previously labeled texts that are most similar to the current text, and ii) the plurality of labels that were previously assigned to individual ones of the previously labeled texts in the set of previously labeled texts that are most similar to the current text, for display in the label selection user interface displayed by the display device of the client computer.

6. The method of claim 5, wherein the current text comprises a previously labeled text to which at least one label has previously been assigned; and
   wherein the label selection user interface displays the label previously assigned to the current text and is further operable to receive a user indication causing at least one label previously assigned to the current text to be de-assigned from the current text in the training dataset.

7. The method of claim 6, further comprising:
   passing the training dataset to a label prediction system, wherein the label prediction system automatically predicts labels for unlabeled texts based on how texts in the training dataset are labeled, and wherein the labels automatically predicted by the label prediction system are assigned to the unlabeled texts;
   storing the training dataset with all previously labeled texts, including at least one label assigned in response to a user indication received by the label selection user interface;
   wherein at least one of the plurality of labels that were previously assigned to individual ones of the previously labeled texts in the set of previously labeled texts that are most similar to the current text was predicted by the label prediction system;
   wherein at least one of the plurality of labels that were previously assigned to individual ones of the previously labeled texts in the set of previously labeled texts that are most similar to the current text was assigned in response to a user indication received by the label selection user interface; and
   wherein the label selection user interface displays at least one of the plurality of labels that were previously assigned to individual ones of the previously labeled texts in the set of previously labeled texts that are most similar to the current text that was predicted by the label prediction system in a visually distinct manner from the at least one of the plurality of labels that were previously assigned to individual ones of the previously labeled texts in the set of previously labeled texts that are most similar to the current text that was assigned in response to a user indication received by the label selection user interface.

8. The method of claim 7, further comprising generating the plurality of previously labeled texts from all previously labeled texts by sampling all previously labeled texts to obtain a subset of all previously labeled texts, wherein each previously labeled text in the subset of all previously labeled texts was labeled during a different one of a set of discrete preceding time periods.

9. The method of claim 8, wherein the current text and the previously labeled texts comprise textual user feedback entered through a user interface for providing user feedback regarding performance of an online meeting application.

10. The method of claim 8, further comprising:
    receiving digital audio data;
    performing speech to text conversion processing on the received digital audio data; and
    wherein the current text and the previously labeled texts comprise text obtained by performing the speech to text conversion processing on the received audio data.

11. A system for generating a training dataset, comprising:
    processing circuitry;
    a memory having program code stored thereon, wherein the program code, when executed by the processing circuitry, causes the processing circuitry to
    extract tokens from a current text to generate a list of tokens for the current text;
    generate, for each one of a plurality of previously labeled texts, a distance between the previously labeled text and the current text, by i) extracting tokens from the previously labeled text to generate a list of tokens for the previously labeled text, ii) comparing the list of tokens for the previously labeled text to the list of tokens for the current text to determine an overlap value for the previously labeled text that is equal to a total number of tokens that match between the list of tokens for the previously labeled text and the list of tokens for the current text, and iii) using the overlap value for the previously labeled text to calculate a distance between the previously labeled text and the current text that is inversely correlated to the overlap value for the previously labeled text;

generate, by the processing circuitry from the plurality of previously labeled texts, a set of previously labeled texts that are most similar to the current text, by selecting a predetermined number of the previously labeled texts that have the shortest distances between them and the current text; and transmit, by communication circuitry to a client computer, for simultaneous display with the current text within a label selection user interface displayed by a display device of the client computer, i) the set of previously labeled texts that are most similar to the current text, and ii) a plurality of labels that were previously assigned to individual ones of the previously labeled texts in the set of previously labeled texts that are most similar to the current text, wherein the label selection user interface is operable to receive user indications that cause at least one label to be assigned to the current text within the training dataset.

12. The system of claim 11, wherein the program code, when executed by the processing circuitry, further causes the processing circuitry to use the overlap value for the previously labeled text to calculate a distance between the previously labeled text and the current text that is inversely correlated to the overlap value for the previously labeled text by causing the processing circuitry to:

calculate a normalization value for the previously labeled text by taking a square root of a product of i) a total number of tokens in the list of tokens for the current text, and ii) a total number of tokens in the list of tokens for the previously labeled text; and set the distance between the previously labeled text and the current text equal to one minus a result of dividing the overlap value for the previously labeled text by the normalization value for the previously labeled text.

13. The system of claim 12, wherein the program code, when executed by the processing circuitry, further causes the processing circuitry to generate, from the plurality of previously labeled texts, the set of previously labeled texts that are most similar to the current text, by causing the processing circuitry to:

sort the distances between the previously labeled texts and the current text in ascending order to generate an ordered list of distances; and select the predetermined number of the previously labeled texts having the shortest distances between them and the current text in response to the ordered list of distances.

14. The system of claim 13, wherein the program code, when executed by the processing circuitry, causes the processing circuitry to extract tokens from the current text to generate the list of tokens for the current text by causing the processing circuitry to i) identify a plurality of words that each occur one or more times in the current text, and ii) store a single copy of each one of the words that occur one or more times in the current text into the list of tokens for the current text; and wherein the program code, when executed by the processing circuitry, causes the processing circuitry to extract tokens from the previously labeled text to generate the list of tokens for the previously labeled text by causing the processing circuitry to i) identify a plurality of words that each occur one or more times in the previously labeled text, and ii) store a single copy of each one of the words that occur one or more times in the previously labeled text into the list of tokens for the previously labeled text.

15. The system of claim 14, wherein the current text comprises a previously labeled text to which at least one label has previously been assigned; and wherein the label selection user interface displays the label previously assigned to the current text and is further operable to receive a user indication causing at least one label previously assigned to the current text to be de-assigned from the current text in the training dataset.

16. The system of claim 15, wherein the program code, when executed by the processing circuitry, further causes the processing circuitry to:

pass the training dataset to a label prediction system, wherein the label prediction system automatically predicts labels for unlabeled texts based on how texts in the training dataset are labeled, and wherein the labels automatically predicted by the label prediction system are assigned to the unlabeled texts;

store the training dataset with all previously labeled texts, including at least one label assigned in response to a user indication received by the label selection user interface;

wherein at least one of the plurality of labels that were previously assigned to individual ones of the previously labeled texts in the set of previously labeled texts that are most similar to the current text was predicted by the label prediction system;

wherein at least one of the plurality of labels that were previously assigned to individual ones of the previously labeled texts in the set of previously labeled texts that are most similar to the current text was assigned in response to a user indication received by the label selection user interface; and wherein the label selection user interface displays at least one of the plurality of labels that were previously assigned to individual ones of the previously labeled texts in the set of previously labeled texts that are most similar to the current text that was predicted by the label prediction system in a visually distinct manner from the at least one of the plurality of labels that were previously assigned to individual ones of the previously labeled texts in the set of previously labeled texts that are most similar to the current text that was assigned in response to a user indication received by the label selection user interface.

17. The system of claim 16, wherein the program code, when executed by the processing circuitry, further causes the processing circuitry to generate the plurality of previously labeled texts from all previously labeled texts by causing the processing circuitry to sample all previously labeled texts to obtain a subset of all previously labeled texts, wherein each previously labeled text in the subset of all previously labeled texts was labeled during a different one of a set of discrete preceding time periods.

18. The system of claim 17, wherein the current text and the previously labeled texts comprise textual user feedback entered through a user interface for providing user feedback regarding performance of an online meeting application.

19. The system of claim 18, wherein the program code, when executed by the processing circuitry, further causes the processing circuitry to:
- receive digital audio data;
- perform speech to text conversion processing on the received digital audio data; and
- wherein the current text and the previously labeled texts comprise text obtained by performing the speech to text conversion processing on the received audio data.

20. A non-transitory computer readable medium for generating a training dataset, comprising instructions stored thereon, that when executed on a processor, perform the steps of:
- extracting tokens from a current text to generate a list of tokens for the current text;
- generating, by processing circuitry, for each one of a plurality of previously labeled texts, a distance between the previously labeled text and the current text, by i) extracting tokens from the previously labeled text to generate a list of tokens for the previously labeled text, ii) comparing the list of tokens for the previously labeled text to the list of tokens for the current text to determine an overlap value for the previously labeled text that is equal to a total number of tokens that match between the list of tokens for the previously labeled text and the list of tokens for the current text, and iii) using the overlap value for the previously labeled text to calculate a distance between the previously labeled text and the current text that is inversely correlated to the overlap value for the previously labeled text;
- generating, by the processing circuitry from the plurality of previously labeled texts, a set of previously labeled texts that are most similar to the current text, by selecting a predetermined number of the previously labeled texts that have the shortest distances between them and the current text; and
- displaying, simultaneously with the current text within a label selection user interface displayed by a display device, i) the set of previously labeled texts that are most similar to the current text, and ii) a plurality of labels that were previously assigned to individual ones of the previously labeled texts in the set of previously labeled texts that are most similar to the current text, wherein the label selection user interface is operable to receive user indications that cause at least one label to be assigned to the current text within the training dataset.

* * * * *